(12) United States Patent
Woods

(10) Patent No.: US 10,598,403 B2
(45) Date of Patent: Mar. 24, 2020

(54) MECHANICAL VENTILATION HEAT RECOVERY APPARATUS

(71) Applicant: Be Hive Technologies Limited, Uxbridge (GB)

(72) Inventor: Garry Woods, Uxbridge (GB)

(73) Assignee: BE HIVE TECHNOLOGIES LIMITED, Uxbridge (GB)

( * ) Notice: Subject to any disclaimer, the term of this patent is extended or adjusted under 35 U.S.C. 154(b) by 63 days.

(21) Appl. No.: 15/923,846

(22) Filed: Mar. 16, 2018

(65) Prior Publication Data
US 2018/0274810 A1    Sep. 27, 2018

(30) Foreign Application Priority Data

Mar. 22, 2017 (GB) .................................. 1704509.7

(51) Int. Cl.
*F24F 12/00* (2006.01)
*F24F 5/00* (2006.01)
(Continued)

(52) U.S. Cl.
CPC .......... *F24F 12/003* (2013.01); *F24F 5/0046* (2013.01); *F24F 11/79* (2018.01); *F24F 12/006* (2013.01); *F24F 13/10* (2013.01); *F24F 2005/0057* (2013.01); *F24F 2005/0067* (2013.01); *F24F 2011/0006* (2013.01); *F24F 2012/007* (2013.01); *F24F 2110/12* (2018.01); *Y02A 30/272* (2018.01); *Y02B 10/20* (2013.01);
(Continued)

(58) Field of Classification Search
CPC .......... F24F 12/003; F24F 13/10; F24F 11/79; F24F 12/006; F24F 2110/12; F24F 2012/007; F24F 2011/0006; Y02B 30/563; Y02B 10/40; Y02B 10/20; Y02A 30/272
See application file for complete search history.

(56) References Cited

U.S. PATENT DOCUMENTS 4,403,731 A * 9/1983 Katz .................... F24D 11/0257
                                                        237/2 B
6,010,113 A * 1/2000 Rotering ................... F16K 3/03
                                                        251/212
(Continued)

FOREIGN PATENT DOCUMENTS

EP        0536445 A1    4/1993
EP        1923643 A2    5/2008

OTHER PUBLICATIONS

Combined Search and Examination Report issued in GB1704509.7 dated May 17, 2017.

*Primary Examiner* — Ana M Vazquez
(74) *Attorney, Agent, or Firm* — Westman, Champlin & Koehler, P.A.; Z. Peter Sawicki; Amanda M. Prose

(57) ABSTRACT

An MVHR system for a building having a roof with at least two pitched slopes facing in different directions. The MVHR system comprises a Heat Recovery Unit (HRU) for exchanging heat between a flow of ambient air and a flow of air from inside the building. The HRU is connected to two ports located on different pitched slopes, and a flow diverter is provided between the HRU and the ports. The flow diverter is switchable so as to reverse the flows of air into and out of the building via the two ports and through the HRU. The system can be combined with photovoltaic solar cells and/or an air source heat pump and/or a ground source heat pump system.

15 Claims, 7 Drawing Sheets

(51) Int. Cl.
 *F24F 11/79* (2018.01)
 *F24F 13/10* (2006.01)
 *F24F 11/00* (2018.01)
 *F24F 110/12* (2018.01)

(52) U.S. Cl.
 CPC ............... *Y02B 10/24* (2013.01); *Y02B 10/40* (2013.01); *Y02B 30/563* (2013.01)

(56) References Cited

U.S. PATENT DOCUMENTS

| | | | | |
|---|---|---|---|---|
| 2005/0236136 | A1* | 10/2005 | Veltkamp | F24F 12/001 165/4 |
| 2014/0202178 | A1* | 7/2014 | Trumbower | B60H 1/00278 62/62 |
| 2014/0360556 | A1* | 12/2014 | Koppikar | H02S 40/44 136/248 |
| 2016/0320097 | A1* | 11/2016 | Leiper | F25B 6/00 |
| 2018/0274806 | A1* | 9/2018 | Arndt | F24F 5/001 |

* cited by examiner

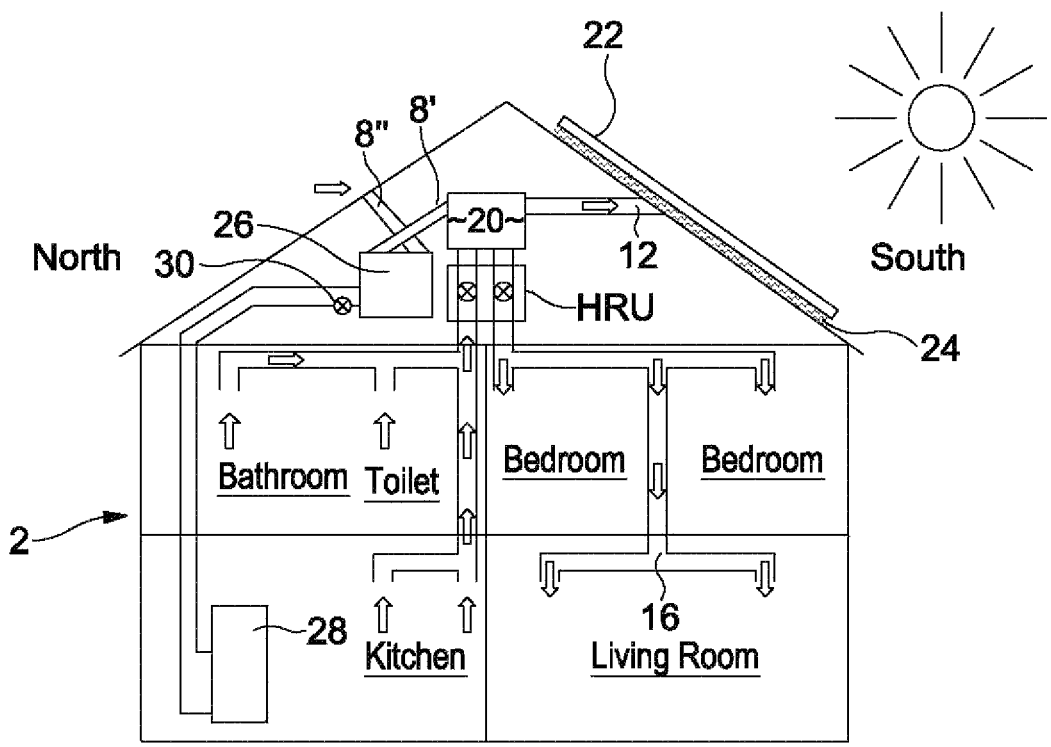
Fig. 4b
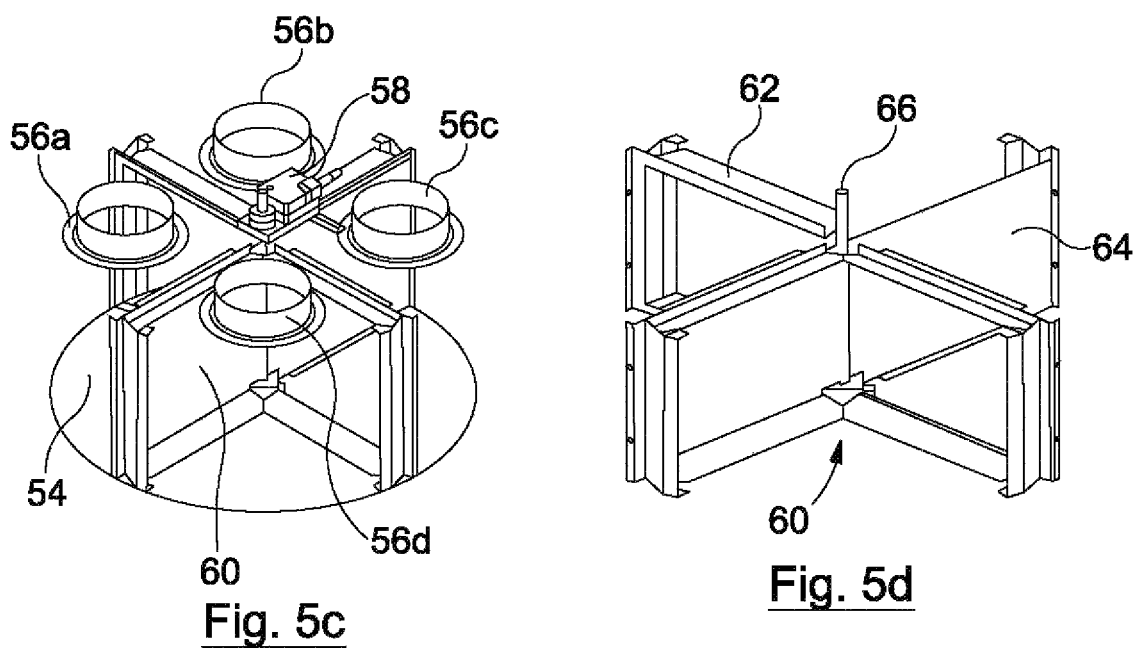
Fig. 5c
Fig. 5d

MECHANICAL VENTILATION HEAT RECOVERY APPARATUS

FIELD OF THE INVENTION

The present invention relates to Mechanical Ventilation Heat Recovery (MVHR) system for buildings, particularly but not exclusively domestic buildings.

BACKGROUND ART

In the search for improvements in the efficiency of buildings such as by increased thermal insulation and weatherstripping (the process of sealing openings such as doors, windows, and trunks from the elements), modern buildings have become more airtight and less well ventilated and thus require some form of energy-effective ventilation system. MVHR systems are energy recovery ventilation systems which use an air-to-air heat exchanger, or Heat Recovery Unit (HRU) which causes the inbound air flowing into the building to exchange heat with the outbound air flowing out of the building, thus providing fresh air inside the building whilst also saving energy by reducing the heating (or cooling) requirement for the inbound air necessary for the interior of the building to be maintained at a comfortable temperature. There are many different types of air-to-air heat exchanger available, some of which are also capable of transferring the humidity level of the exhaust (outbound) air to the intake (inbound) air. MVHR systems are becoming increasingly prevalent in new buildings and new build houses. Many MVHR systems take advantage of buildings which are designed with a pitched roof, i.e. a roof having at least two pitched slopes; often there is unused space under at least a part of the pitched roof, so that many of the elements of the MVHR system (the HRU, the fans, etc.) can conveniently be placed in this space, and the ducting leading to the inlet for inbound air and to the outlet for exhaust air can also fit into this space. Consequently the inlet and outlet are often located on the pitched slopes, usually on different, often opposite slopes.

One problem with conventional MVHR systems is that they function by exploiting the difference between ambient temperature outside the building and the desired temperature inside the building. Whilst the desired internal temperature varies little according to season (the normal range of inside air temperatures which are deemed comfortable for humans is between about 16° C. and about 22° C.), ambient temperature outside the building varies over a much greater range (in the United Kingdom between about −5° C. and about 30° C.). In recognition of this variability in ambient temperature, and that whatever the ambient temperature one side of a building (the side which generally faces north) is usually cooler than another (the side which generally faces south), it is known to be good practice for MVHR systems to be installed so that inbound air is drawn from one side of the building, whilst outbound air exhausts from another side of the building, usually the opposite side (UK building regulations say that there must be a minimum of 30 cm between inlet and outlet vents, but it would be poor practice to site the outlet so close to the inlet, particularly if both were on the same side of the building). This takes advantage of the fact that when one side of a building is in direct sunlight, the opposite side is in shade. A feature of MVHR systems is that they are essentially static, in that their essential elements are fixed in position (they form part of the building). This means that if the inbound air is drawn from the southerly side of the building, in winter this air is warmer than the air on the northerly side of the house, thus reducing the energy required to raise it to the required internal temperature; however, in summer this inbound air is much warmer than the desired internal temperature, and warmer than the air on the northerly side of the house, thus increasing the energy required to lower it to the required internal temperature. If the inbound air is drawn from the northerly side of the building, in summer this air is cooler than the air on the southerly side of the house, thus reducing the energy required to lower it to the required internal temperature; however, in winter this inbound air is much colder than the desired internal temperature, and colder than the air on the southerly side of the house, thus increasing the energy required to raise it to the required internal temperature. One solution to this might be to reverse the flows through the MVHR system according to season; however, MVHR systems are not designed for reverse flows. Within the building, air inlets and outlets are located so as to be most efficient at introducing fresh air and removing exhaust air and so as to minimise the noise of the fan(s) which drive the air flows, so reversing the air flows would adversely affect the efficiency of the system, and lead to increased noise. It is also common for the inbound air to pass through a filter system, to remove undesirable dust, pollen, etc. from the inbound air before it enters the building; reversing the flow of air would risk allowing inbound air to entrain these filtered particles and carry them inside the building to the discomfort of the occupants. Further, if the air flows were to be reversed then it would be necessary to provide a second filter system to remove undesirable particles from the inbound air flow when the flow is reversed.

SUMMARY OF THE INVENTION

The present invention therefore provides an MVHR system for a building having at least two large outer surfaces facing in different directions, the MVHR system comprising a Heat Recovery Unit (HRU) for receiving and exchanging heat between a flow of ambient air from outside the building and a flow of building air from within the building, the HRU being connected by fluid flow conduits to first and second ports located on different surfaces, in which a flow diverter is provided in the conduits between the HRU and the ports, the flow diverter being switchable between a first state in which ambient air flows from the first port to the HRU and into the building and building air flows from the HRU to the second port to be exhausted from the building, and a second state in which ambient air flows from the second port to the HRU and into the building and building air flows from the HRU to the first port to be exhausted from the building.

With such an arrangement the inbound and outbound air flows can be reversed upstream of the HRU, and upstream of all other elements of the MVHR system such as filters, fans, etc. so that in operation there is no flow reversal in the majority of the system, and the problems associated with flow reversal described above can be avoided. Moreover, because the system can be controlled so as to choose which port to draw inbound air from (namely that where the ambient air temperature requires the least energy to raise or lower it to the desired temperature inside the building) overall energy usage by the MVHR system is reduced. In summer, relatively cool air from the northerly side of the building can be drawn in, and in winter relatively warm air from the southerly side of the building can be drawn in as inbound air. The invention saves energy due to significant heating and hot water reduction in (mostly) the spring and autumn months when there is still plenty of sun light but the house needs heating in the evening. In winter when the sun comes out it is hoped to reduce the heating demand by the warm air entering and by reducing the amount of time the building's main heat source (which could be any other heat source, such as a gas boiler or an Air Source Heat Pump (ASHP)) needs to run, so that the expected saving in winter should be in the region of 20 to 30%. When the system is used for cooling it will of course reduce the temperature in the house and will also reduce the energy demand if there were some sort of active cooling system in the property, but if there is no such cooling system it provides a method of reducing the internal temperature (and has no saving as such indirectly of energy). Conveniently, where the building has a roof with at least two pitched slopes facing in different directions, the first and second ports may be located in these two slopes. The location of the ports under a pitched roof means that much of the ducting for the air flows to and from the ports can be accommodated in the unused eaves space within the roof. Additionally or alternatively, the first and second ports may be located in the outer walls on different sides of the building.

In practice, few buildings are orientated precisely North-South, but with most pitched roofs or outer walls it will be possible to identify one pitched slope which is more northerly facing and another which is more southerly facing, and the ports would normally be located on these surfaces so as to optimise the energy saving potential. It may be advantageous (and possible) to locate the ports on pitched slopes or walls which face in opposite directions.

The flow diverter is preferably adapted to switch the flows of ambient and building air between the first and second states simultaneously. A simultaneous flow change upstream of the HRU and of the remainder of the MVHR system means that there is no pressure change in the system downstream of the flow diverter which might dislodge dust or other undesirable particles and introduce them into the air flowing into the building, and also minimises noise because the flow diverter can "balance" the instantaneous changes as it operates. The flow diverter may incorporate a separate plenum for each flow of air, into and out of the building, to flow through; these plenums acts advantageously as noise attenuators, and can also act as "traps" to supplement any filters for trapping unwanted particles in the inbound air.

The flow diverter may comprise a generally airtight and cylindrical drum having four ports for air to flow through located on at least one end face of the drum, the drum containing a rotatable vane, the ports being disposed such that rotation of the vane within the drum switches air flows between the first and second states, or vice versa. This simple arrangement, which is described further below, is simple and inexpensive to manufacture. Moreover, rotary movement of the vane can be in the horizontal plane (i.e. about an essentially vertical axis), which allows the vane to be balanced and minimises the power required to turn it.

The system may further comprise a sensor for determining the ambient temperature outside the building, and a controller adapted to switch the flow diverter from the first state to the second when the ambient temperature exceeds a first threshold temperature. The controller can be adapted to switch the flow diverter from the second state to the first when the ambient temperature is less than a second threshold temperature. In this way, the system can be set up so as to optimise energy savings according to the wishes of the building's occupants as to an acceptable inside temperature, and according to the prevalent seasonal shift in temperature. For simplicity, the first and second threshold temperatures could be the same.

There could be an Air Source Heat Pump (ASHP) in the fluid flow conduit between the northerly port and the flow diverter for exchanging heat between ambient air and building air as air either leaves or enters the building. The building air is warm in summer when it enters from the north side of the building, and it is also warm in the winter when it exits through the same north outlet. The ASHP could be supplemented with a heat sink (Thermal Store) for storing heat absorbed by the ASHP from ambient air flowing from the said port from or to the HRU; heat energy stored in this heat sink could be used to heat and provide hot water to a whole building of up to 120 m$^2$ in size, or act as a supplement to a larger building's heat system. If a solar photovoltaic power (PV) system were used to power the ASHP, then this additional heat energy would be effectively "free". In summer when the ASHP is running at a high COP (Co-efficient of Performance) of 3.5 to 4, meaning that for every 1 Kw of such "free" energy used to run the ASHP it will produce 3.5 to 4 Kw of free heat; this is due to the high ambient air temperatures going through the ASHP as it creates the heat by the use of the energy provided from the PV. The use of stored heat energy from the heat sink can heat the building at night and/or provide all the building's hot water. The ASHP will also work in winter, but less efficiently. The bigger the PV array is the more free heat will be generated.

PV systems are generally more efficient the cooler they get; their electrical output is usually measured when the ambient temperature is 25° C.; for every 1° C. above this temperature a PV panel will lose approximately 0.5% efficiency—so on an averagely warm day the air temperature can easily reach 45° C., reducing the efficiency of the PV panel by 10% (the same efficiency change applies below 25° C., so in winter or at low ambient temperatures PV panels are more efficient, but in winter there is less solar energy for the PV panels to convert to electricity). In a particularly advantageous arrangement therefore, the PV system may comprise a flat panel array (such as a plurality of separate PV panels connected together in a flat structure, in which the adjoining edges of adjacent panels are joined so as to prevent airflow between the panels, for example), which is mounted so as to lie in or against but spaced from one of the walls or pitched slopes of the roof of the building, and so as to overlie, or surround, the port in the slope; the slope would preferably be the most southerly facing slope of those on the pitched roof. This means that in the summer setting, when the inbound air is drawn from the northerly port and when or if the ASHP is working and cooling the inbound air further to cool the building, now as the building is cooler inside the cooled air is exhausted from the southerly port under the PV array, and as the outbound air is somewhat cooler than the temperature of the air under the PV panels which has been heated by the sun, the outbound air cools the PV panels allowing them to operate around 10 to 15% more efficiently. In winter the air beneath the PV array is warmed by the PV array which is itself heated by sunlight falling on it; this means that the air which is drawn in through the port beneath the PV array during the day can be anything between about 5° and 15° C. warmer than the outside air temperature.

In winter when air is drawn in from the south side there may be means for temporarily reversing flows of air flowing through the MVHR system; this would allow the system to pump warm air beneath the PV array, which is helpful in clearing snow which is covering the PV array. There may be directing means for ensuring that the flows of air through the ASHP remain in the same direction regardless of the state of the flow diverter, and the flow diverter, the ASHP and the directing means may be formed in a single, integral unit. Additionally or alternatively there may be a Ground Source Heat Pump (GSHP) having a ground source, or collector, and in thermal communication with the heat sink, or a first GSHP in thermal communication with the ground collector and the heat sink and a second, relatively smaller GSHP in thermal communication with the first GSHP and a borehole (or ground source), the first and second GSHPs acting in cascade. With such a cascade arrangement, the second GSHP stores heat or coolant in the borehole/ground source in summer ready for use to heat/cool the building at a later time, and the GSHP can be powered by the PV array. Further, the air leaving the building will be slightly cooler than ambient, and this air can be used to cool the PV array, making the PV array more efficient and so produce further energy. Where there is a GSHP, by using the waste heat in the air extracted (in winter) from the north side, the system enables the fluid in the ground collector to be warmed up, this will make the GSHP 30 to 40% more efficient. In summer when air enters from the north the inbound air is cooled by circulating the fluid in the GSHP's ground collector through the same heat exchanger. A relatively small GSHP and large thermal store means the small GSHP can run for free powered by the solar PV array with the heat created free and stored for later use. Should the small GSHP not be of a sufficient size to heat the building than it can be in communication with the second GSHP and the ground source (such as one or more boreholes) acting in cascade. With such a cascade arrangement, the second GSHP only comes on when there has not been enough energy (or heat) stored in the thermal store. Further, the air leaving the building will be much cooler than the air temperature under the PV array (which could be as much as 40 to 50° C.), and this can be used to cool the PV array, making the PV array more efficient and so produce further energy.

The invention also provides a method of operating a MVHR system for a building, the system comprising a Heat Recovery Unit (HRU) for receiving and exchanging heat between a flow of ambient air from outside the building and a flow of building air from within the building, the method comprising switching the flows of air between a first state in which ambient air flows from a first port to the HRU and into the building and building air flows from the HRU to a second port to be exhausted from the building, and a second state in which ambient air flows from the second port to the HRU and into the building and building air flows from the HRU to the first port to be exhausted from the building, wherein the method comprises locating the first and second ports on different parts of the the building (e.g. walls or pitched roof slopes), which parts face in different directions.

BRIEF DESCRIPTION OF THE DRAWINGS

The invention will now be described by way of example and with reference to the accompanying figures, in which;

FIG. 4b is a further schematic view of the house of FIG. 4a, in summer;

FIGS. 5a to 5d are perspective views of the flow diverter of FIG. 2, FIG. 5a shows the flow diverter externally, FIG. 5b shows the flow diverter without its upper plate to show its internal arrangement, FIG. 5c shows the flow diverter without its upper plate or its cylindrical casing to better show the internal arrangement, and FIG. 5d shows the movable vane arrangement which is inside the flow diverter;

FIGS. 7a to 7c show the operation of the unit of FIG. 6a, and

DETAILED DESCRIPTION OF THE EMBODIMENTS

Figure 1:
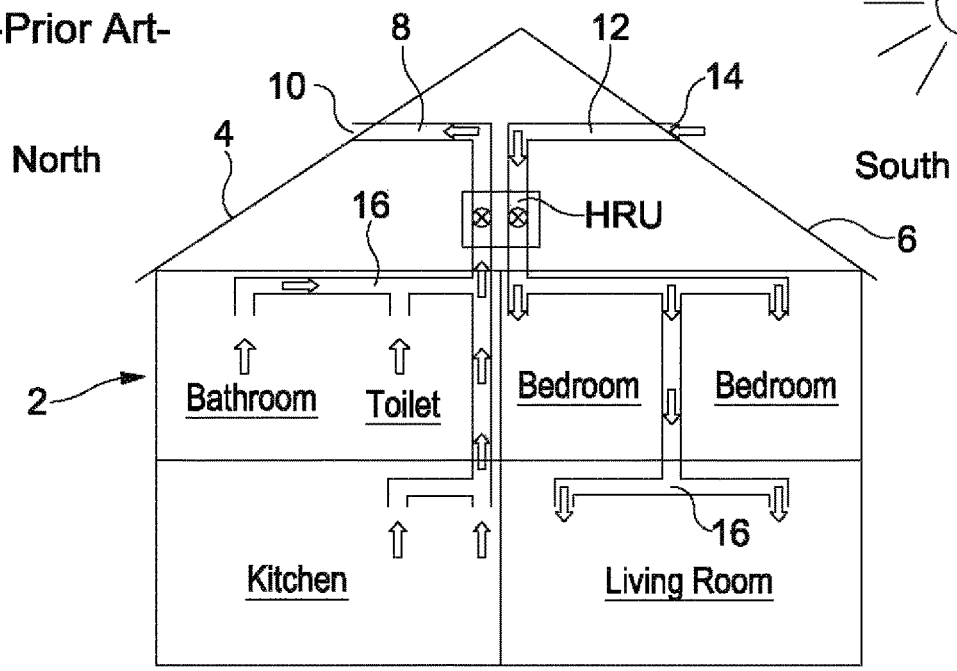
FIG. 1 is a schematic view of a domestic house with a typical, conventional Mechanical Ventilation Heat Recovery (MVHR) system.

FIG. 1 shows a domestic house 2 equipped with a typical MVHR system; the house has a pitched roof having two pitched slopes, one slope 4 on a northerly facing side of the house and a second slope 6 on the opposite, southerly facing side of the house. The MVHR system comprises a Heat Recovery Unit HRU which is connected by air flow ducting 8 to a port 10 on the north slope 4 of the roof, and by air flow ducting 12 to a port 14 on the south slope 4 of the roof. Arrows in the drawing show the air flows within the MVHR system. The HRU is provided with fans to draw warm, humid air from the kitchen, bathroom and toilet in the house and to exhaust this outbound air through conduit 8 and port 10 out of the house. Air passageways or ducts 16 are provided to direct the flows of air inside the house. Fans in the HRU also draw fresh, ambient air (inbound air) from outside the house, through port 14 and conduit 12 and into the bedrooms and living room in the house. The HRU also includes heating/cooling means (not shown) for heating or for cooling the inbound air so that it enters the living room and bedrooms at a comfortable temperature. In addition, the HRU is configured such that the flows of inbound and outbound air pass each other, usually in opposite directions, in an arrangement which facilitates heat exchange between the two air flows; this heat exchange arrangement is intended to supplement the means for heating or cooling the inbound air and thus reduce overall energy usage (although note that all MVHR systems have a bypass operable in summer to avoid warm air leaving the house from heating the air entering; this summer bypass is usually actuated when the air temperature entering the unit reaches 18°). In winter, when the sun is shining on the southerly roof slope 6, ambient air around port 14 is likely to be at a higher temperature than ambient air surrounding port 10 in northerly slope 4; as inbound air passes through the HRU, it is warmed further by heat exchange with the warm outbound air leaving the kitchen, bathroom and toilet, thus reducing the energy required to bring the temperature of this inbound air to the desired comfortable level to be blown into the living room and bedrooms. In summer, however (which is what is illustrated in FIG. 1), the air which enters through port 14 is likely to be much warmer than the air surrounding port 10, and is probably also warmer than the air to be exhausted from within the house; whilst this inbound air can be cooled to an extent through heat exchange in the HRU, it will need to be cooled further by the heating/cooling means to bring it to a temperature which is comfortable to the house's occupants. Because the inbound air is drawn from the warmer, southern side of the house it will require more energy to cool it than would be required if the inbound air were drawn from the cooler, northern side of the house. But it would not be feasible to reverse the flow of air through the MVHR system, as this would lead to inbound air entering into the house in the kitchen, bathroom and toilet, and outbound air being drawn from the living room and bedrooms—this would mean that humid air carrying cooking and other smells would be drawn through other, occupied parts of the house before being exhausted from the house, which would not be pleasant for the occupants. It will be appreciated also that, were the arrangement to be such that the inbound air were drawn in through port 4 on the north side of the house and outbound air exhausted from port 14 on the south side of the house, whilst this would lead to reduced energy usage by the heating/cooling means in adjusting the inbound air flow temperature to what is comfortable (i.e. cooling the inbound air flow) in summer, in winter when ambient air temperature is low generally, but lower on the north side of the house than on the southern, sun-facing side of the house, then the heating/cooling means would require more energy to bring the inbound air temperature to a comfortable level than if it were drawn from the south side of the house. It will also be appreciated that there are often temperature fluctuations which run counter to seasonal norms—an unusually warm day during winter, or an unusually cold day in summer—and that however the MVHR system is installed (it is usually built into the house and is as static a part of the house as are radiators and the associated plumbing, for example) the MVHR system will use more energy than theoretically it needs.

MVHR systems in accordance with the invention are predicated on the concept of reversing the air flows in only a part of the system. In the system shown in FIG. 2a (which shows a house 2 with an MVHR system in the summer), a flow diverter 20 is located in the air flow ducting 8, 12 between the HRU and the ports 10, 14. Inbound air is drawn in through the port 10 on the northern slope 4 of the roof, flows along the ducting 8, through the flow diverter 20 and the HRU and into the house via internal passageways 16. Stale air is drawn into the passageways from the kitchen, bathroom and toilet and flows to the HRU, through the flow diverter 20 and the ducting 12 to exhaust from the port 12 on the southern slope 6 of the roof. In this example, the air to the north of the roof is cooler than the air to the south, so the heating/cooling unit has less work to do to reduce the temperature of the air pumped into the house to what is desirable/comfortable for occupants of the house (compared to drawing inbound air through port 12).

Figure 2A:
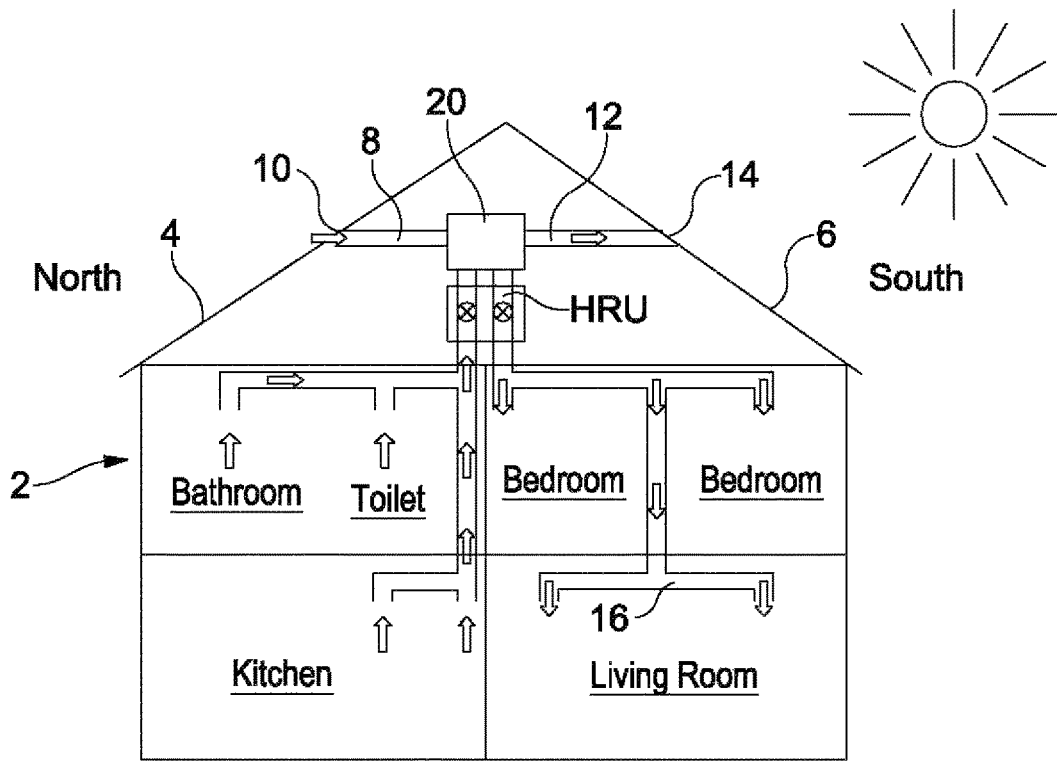
FIGS. 2a and 2b are schematic views of a house having an MVHR system with a flow diverter in accordance with the present invention, in summer and winter respectively.
Figure 2B:
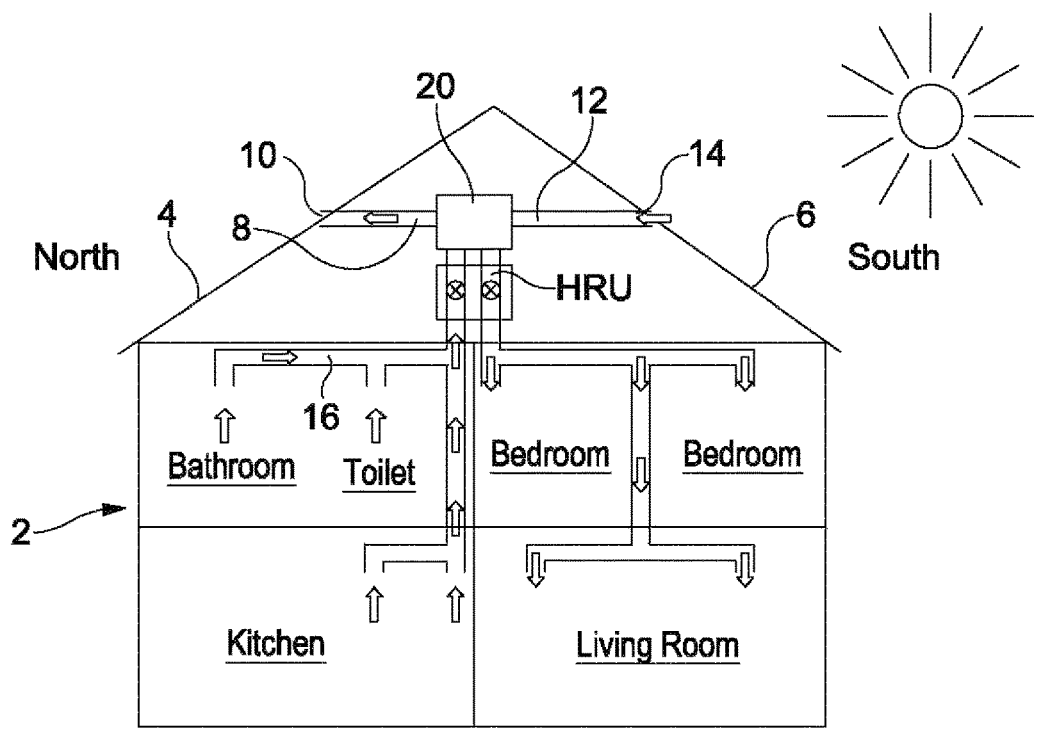

Referring now to FIG. 2b, the same system is shown in the winter, and it can be seen that the flows of inbound and outbound air between the HRU and outside the house are reversed compared to those same flows in FIG. 2a: inbound air is drawn in through the port 14 on the southern slope 6 of the roof, flows along the ducting 12, through the flow diverter 20 and the HRU and into the house via internal passageways 16. Stale air is drawn into the passageways from the kitchen, bathroom and toilet and flows to the HRU, through the flow diverter 20 and the ducting 8 to exhaust from the port 10 on the northern slope 4 of the roof. In this example, the air to the south of the roof is warmer than the air to the north, so the heating/cooling unit has less work to do to increase the temperature of the air pumped into the house to what is desirable/comfortable for occupants of the house (compared to drawing inbound air through port 10).

It will be appreciated that not all buildings are precisely aligned north-south; nevertheless in any building having a pitched roof with two or more pitched slopes there will be one slope which tends to be warmer—the one which is generally more south facing—and one which tends to be cooler—the one which is generally more north facing, and in installing an MVHR system in accordance with the invention the ports would normally be located in these slopes (the ones with the greatest temperature variation) in order to optimise the efficiency of the system. Moreover it will be understood that the system can operate to save energy other than seasonally (e.g. on a hot day in winter, or a cold day in summer), and all that is necessary is a suitable set of sensors, to measure the temperature inside the house, and/or outside the house, with a controller set to actuate the flow controller either when the external temperature passes a certain threshold, or when the temperature difference reaches a certain value. In this way, the system can ensure that the MVHR system is operating at its optimum efficiency for the temperature at any particular time. In practice we have found that setting an ambient temperature of 16° C. as the threshold, so that the flow diverter changes the air flows as the ambient temperature increases or reduces past that temperature, represents a simple threshold which is suitable for homes in the climate of the United Kingdom. Other threshold temperatures may be appropriate in other climates, as will be understood by those skilled in the art.

Figure 3:
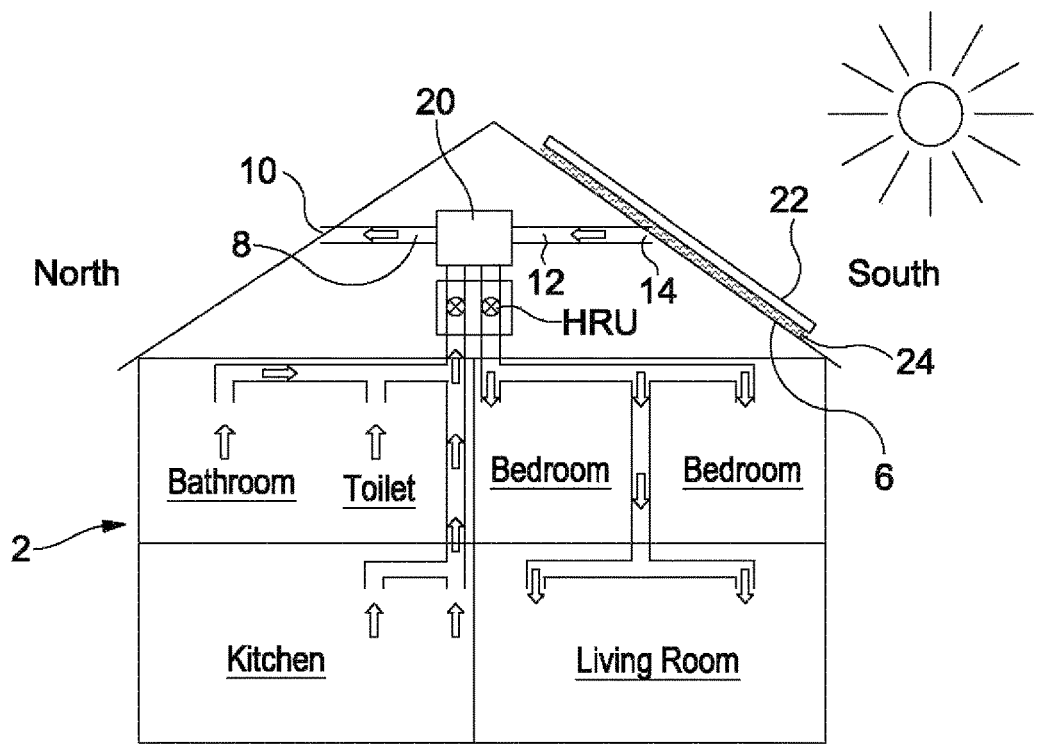
FIG. 3 is a schematic view of the house of FIG. 2 with a roof-mounted solar photovoltaic (PV) array in winter.

FIG. 3 shows how the present invention can provide yet further advantages; the house 2 is shown in winter, with the flow diverter arranged so that inbound air flows in through port 14 on the warm slope 6 to the south of the house and outbound air is exhausted form the port 10 on the opposite side of the roof. A solar photovoltaic (PV) array 22, comprising one or more panels is mounted to the slope 6, so as to capture the maximum amount of solar energy. Air in the gap 24 between the PV array 22 and the roof slope 6 is still, being sheltered from wind, etc. by the smallness of the gap 24, and is warmed by radiation and conduction from the PV array 22, to a temperature higher than that or the air a greater distance away from the slope 6 (on a sunny day, the temperature difference between the air trapped in the gap 24 and that further away from the house can be as much as 20° C.), and this "pre-warming" of the inbound air not only adds to the energy saving of the heating means, it also helps lower the temperature of the panels in the PV array 22, which increases the efficiency at which they transform radiant energy into electrical power, which is very advantageous. In practice, making the PV array as large in area as possible, with no air gaps between individual panels making up the array, provides the best performance in this respect (though of course this should be tempered by the size of the gap 24, so as not to put an excessive load on the HRU fans working to draw inbound air into the building).

On occasion in winter the PV array 22 will become wholly or partially covered by snow, which will reduce its ability to generate useful electricity. In such circumstances the flow diverter could be directed to reverse the flow of air through the MVHR system, so that inbound air is drawn through the northerly port 10 and relatively warm outbound air is exhausted via the port 14 beneath the PV array; this warm air heats the PV array 22 and melts the snow resting on top of the PV array. The flow is diverted in this way until the snow is cleared. Operation of the MVHR system in this way to clear snow could be manually actuated, possibly with the flow being diverted for a predetermined time before it reverts to the flow arrangement of FIG. 4, or it could be automatic, with sensors to detect the presence of snow on the PV array (this could be done by knowing that it was daylight (using a separate daylight sensor, or a clock, for example) but sensing that the PV array was not generating electricity; if this situation arose in summer, the system could actuate a warning message, in winter it could be assumed that the PV array is covered by snow and/or ice, and the clearance process described above actuated).

Figure 4A:
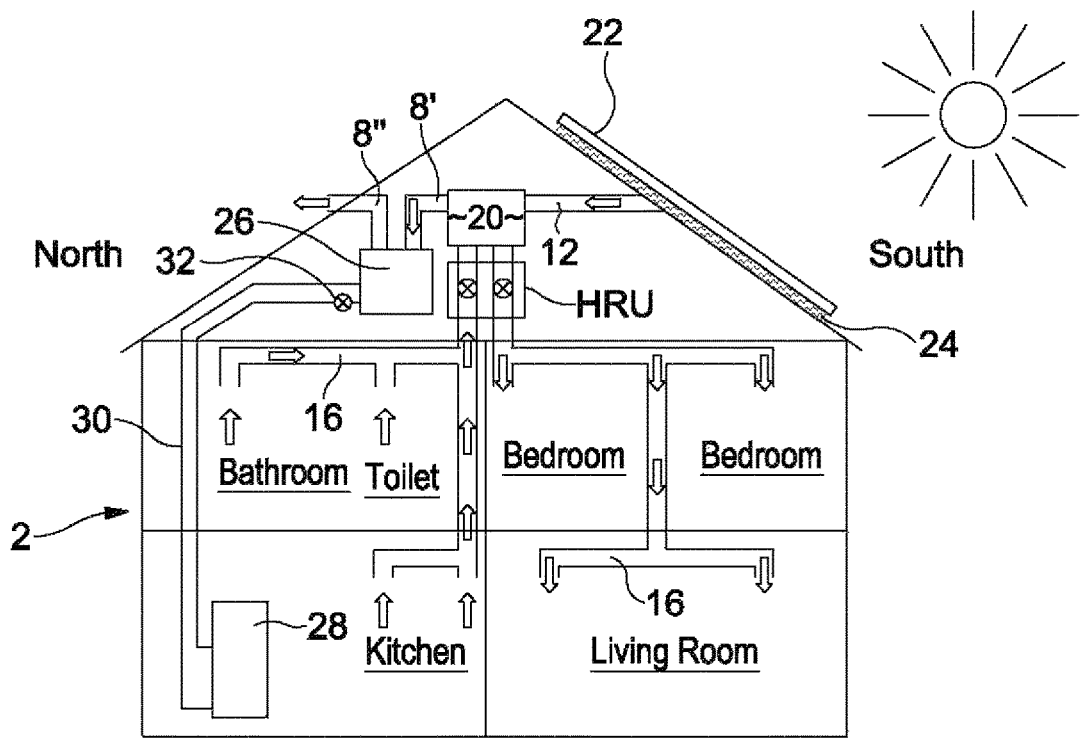
FIG. 4a is a further schematic view of the house of FIG. 3, also in winter, but additionally provided with an Air Source Heat Pump (ASHP) and a heat sink.

FIG. 4a shows the system of FIG. 3 with the addition of an Air Source Heat Pump (ASHP) 26 to recover heat energy from the outbound air before it leaves the building. The air flow ducting 8 to the north side of the house is split into two parts, 8' and 8", so that the outbound air flows through the ASHP 26. The ASHP acts to remove heat energy from the outbound air in the known manner, so that the outbound air is exhausted at a temperature much closer to ambient outside temperature; the extracted heat energy may be released inside the building, as hot water-filled radiators, underfloor heating and/or domestic hot water supply, etc., or it can be conducted to a heat sink 28 where it is stored for future use. The working fluid from the ASHP to the heat sink circuit 30 is circulated by a single pump 32 that moves the hot water produced by the ASHP to the heat sink which, most advantageously, is powered with electricity from the PV array 22. We estimate that under the normal conditions in the United Kingdom (and ignoring equipment and installation costs) such a system can provide free heat for up to 8 to 9 months of the year—in the winter months, when solar energy is insufficient, the pump 32 can be powered from another source. The ASHP will come on automatically when the PV array is producing more power than the house is using and storing it for later, or if the ASHP is designed to heat the house as well and if there is not enough stored free heat, it will come on when there is a heat or hot water demand in the property.

FIG. 4b shows the system of FIG. 4a operating in summer Here, the flows in the air flow ducting 8, 12 is reversed compared to FIG. 4a, so inbound air is drawn in through the air flow ducting 8'", 8' on the cooler north side passes through the ASHP 26, then the flow diverter 20, the HRU and into the house. It will be noted that the ducting 8', 8" is reversed as it leads into the ASHP. This is because the flow through the ASHP must always be in the same direction for the ASHP to function. This reversal of the ducting is described further below, in connection with FIGS. 6 and 7. Through its refrigerant cycle when heating the hot water or heat sink, the ASHP extracts heat energy from the already cool air on the north side of the house to cool it a little more, and the heating/cooling means in the HRU cools the inbound air to the desired degree before it is pumped into the building. The outbound air flows through the HRU, the flow diverter 20 and the air flow ducting 12 to exit the building into the gap 24 between the southern slope of the roof and the PV array. Because this air is cooler than the ambient air, this cools the rear of the PV array, thereby enabling it to operate more effectively and providing further efficiency.

As an addition or alternative to the heat sink 28 the system can incorporate a conventional ground source heat pump (GSHP—not shown, but as is known a GSHP system would usually comprise an underground fluid circuit, or ground collector, for exchanging heat between a heat transfer fluid and the ground outside the house, a pump for pumping the heat transfer fluid around the fluid circuit and a heat exchanger located within the house (adjacent to, integral with or instead of heat sink 28) and communicating with the fluid circuit for exchanging heat, directly or via another transfer fluid, with the ambient air within the house with the transfer fluid). The system with a GSHP is capable of cooling the home all summer via the MVHR or a fan unit or even using chilled ceilings, but it can cool the property whether the GSHP is running or not so the home can have constant background comfort cooling 24 hours a day. In winter when there is no cooling demand the system helps re-charge the GSHP ground collector with the waste warm air that is leaving the house. This is especially effective when the solar PV is working and the system is collecting heat from underneath the solar PV array. The warming of the ground collector makes the GSHP much more efficient by raising the temperature of the fluid in the ground collector, and the warmer this fluid gets the more efficient the overall system becomes. In this arrangement the ASHP 26 shown in FIGS. 4a and 4b acts as a heat exchanger (or is replaced by a heat exchanger) which is in thermal communication through the transfer fluid in the heat sink circuit 30 to the heat sink 28, but via a ground source heat pump (GSHP—not shown). In summer when the GSHP is running the it creates chilled fluid which runs through the heat exchanger which then cools the incoming air (thus cooling the building), it also cools the fluid in the ground collector itself. As the house is being cooled, the air leaving will be slightly cooler than usual, and this can be ducted under the PV array, cooling it and thereby increasing its efficiency by 10 to 15%. In winter when there is no cooling demand the system helps recharge the ground collector with heat energy from the warm waste air leaving the house. Because of the efficiency of such a system, the size or extent of the ground collector for the GSHP can be reduced; where the ground collector is in the form of a number of boreholes, it has been found that the number and/or depth of the boreholes can be reduced, by an extent which reduces the construction cost of the ground collector by an amount equal to or more than the cost of the MVHR system.

Figures 5A, 5B:
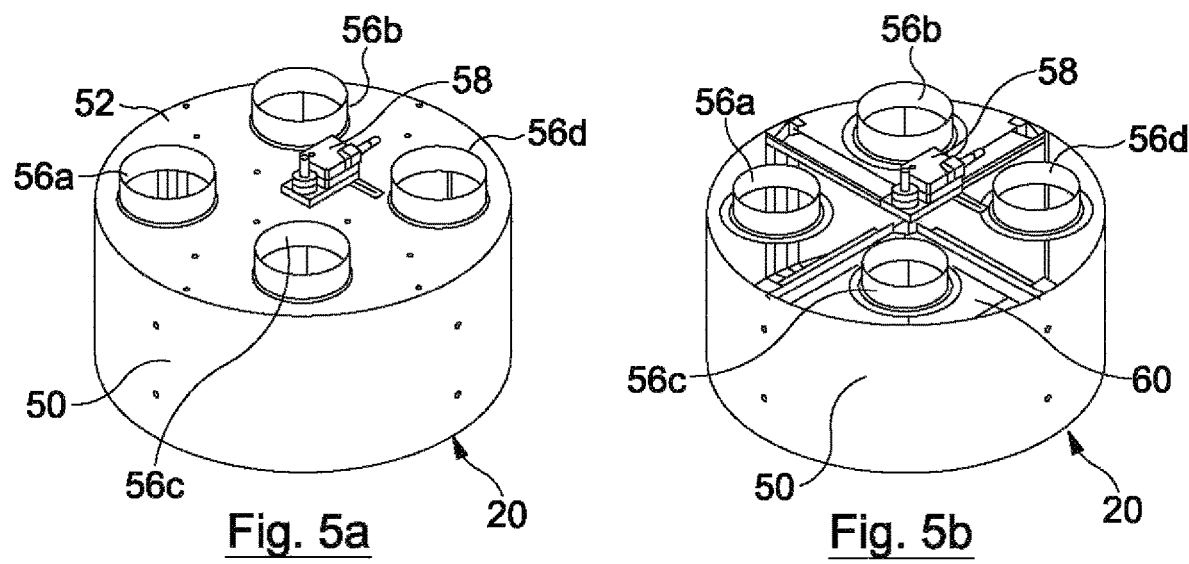

FIGS. 5a to 5d are four perspective views of the flow diverter 20 of FIGS. 2 to 4. FIG. 5a is an external view of the flow diverter, FIG. 5b shows the flow diverter with the top plate removed, FIG. 5c shows the flow diverter with both the top plate and the cylindrical casing removed to show the inner workings of the flow diverter, and FIG. 5d shows the inner vane mechanism. The flow diverter is generally airtight and comprises a generally cylindrical casing 50 which is closed at its ends by a top plate 52 and a bottom plate 54 (shown in FIG. 5c). There are 4 ports 56a-d provided in the top plate 52, for connecting the flow diverter 20 between the HRU and the air flow ducting 8, 12. Inside the casing 50 is a vane mechanism 60 which comprises a fixed frame portion 62 and a rotatable vane 64; the fixed frame portion 62 is mounted fixedly to the interior of the casing 50 and the top and bottom plates 52, 54. The upper part of frame 62 runs between the four ports 56a-d so as to separate them into two pairs (shown as 56a and 56d in one pair, and 56b and 56c in the other pair). Vane 64 is rotatable about spindle 66 between a first position in which it is parallel to frame 62 and a second position in which it is perpendicular to frame 62; the arrangement is substantially airtight at both positions to ensure the flow of air is as intended, but during movement in between these end positions it is not completely airtight, instead there is a small gap (about 5 mm or less) between the edges of the vane 64 and the cylindrical casing 50 and top and bottom plates 52, 54 so that the air does not restrict the vane from moving freely (because a small amount of air can flow around the edges of the vane 64 as it moves) and so that any minor damage, dents, etc. to the flow diverter do not impede the movement of the vane. Movement of the vane is actuated by mechanism 58, which rotates the vane back and forth under the control of an automatic controller (not shown) which is responsive to the input desired temperature within the house (which can be set by way of a thermostat, or other similar device) and the external ambient temperature. We envisage the vane taking about 20 seconds to move between positions. In the first position, where vane 64 lies against and parallel to frame 62, air can only flow between port 56a and 56d, and between port 56 b and port 56 c. In the second position, where vane 64 is rotated so as to be perpendicular to frame 62 (as clearly shown in FIGS. 5c and 5d), air can only flow between port 56a and port 56b, and between port 56c and port 56d. Thus by switching the vane 64 between the first and second positions the flow diverter can change the flow directions in air flow ducting 8, 12 without affecting the air flow directions in the other parts of the MVHR system. The flow diverter is in effect a 4/2 directional control valve, however the large volume within the casing 50 is advantageous over a plain valve because this volume acts as a noise attenuating plenum, preventing noise from the MVHR system from leaking outside the building, and preventing noise from the flow diverter from entering the building. In practice, the flow diverter would be insulated, internally and externally, to reduce noise and condensation.

Figure 6A:
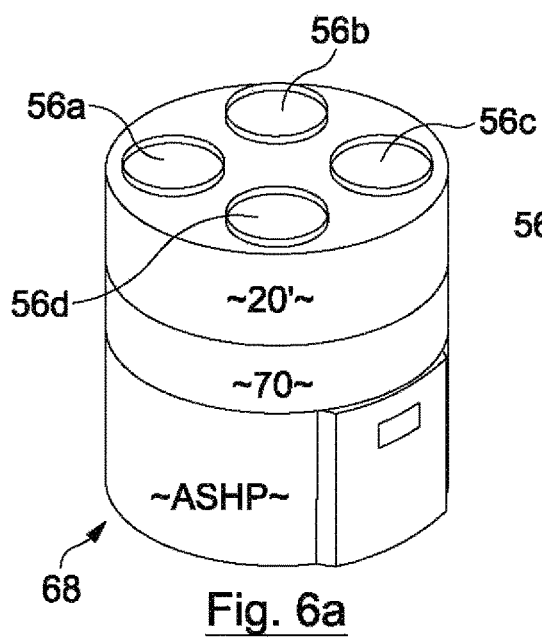
FIG. 6a is a perspective line view of a unit comprising a flow diverter, a transition drum and an ASHP.
Figure 6B:
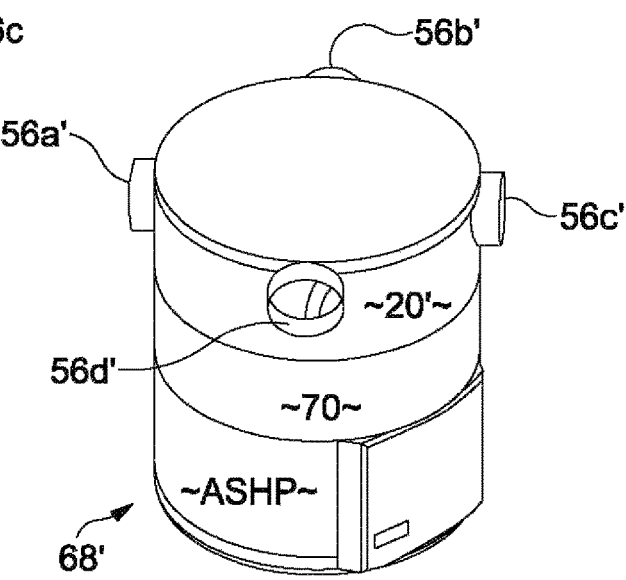
FIG. 6b is a schematic view of a unit similar to that of FIG. 6a but with a different arrangement of inlet and outlet ports.

Referring back to FIGS. 4a and 4b, it will be appreciated that some form of flow diverter for the flows of inbound and outbound air to/from the AHSP would be desirable; the units 68, 68' illustrated in FIGS. 6 and 7 provide just such an arrangement. In FIG. 6a, the flow diverter 20 sits above a transition drum 70 which in turn sits atop an ASHP, the joins between the three elements being substantially airtight and forming a single unit 68. The top of the transition drum 70 may be the bottom plate 54 of the flow diverter, so that the two may be manufactured as one unit. In FIG. 6b, the flow diverter 20' has a different arrangement of inlet and outlet ports 56a' to 56d' (they are arranged around the circumferential casing 50, rather than on the top plate 52) but otherwise the unit 68' in FIG. 6b is the same as the unit 68 in FIG. 6a, and they operate in the same manner. There are ports (not shown) in the bottom plate of the flow diverter 20, 20' which communicate with ports on the top of the transition drum 70, which communicates in turn with ports in the top of the ASHP (inlet port 72 (through which air flows into the ASHP) and outlet port 74 (from where air exhausts from the ASHP). The ASHP has a built in fan (not shown) that sucks and blows the air through the unit 68, 68' so it does not rely on the air flow generated by the MVHR to work. The flow diverter 20, 20' together with the transition drum 70 ensures that the air entering the ASHP always enters through port 72 and leaves through port 74.

Figure 7C:
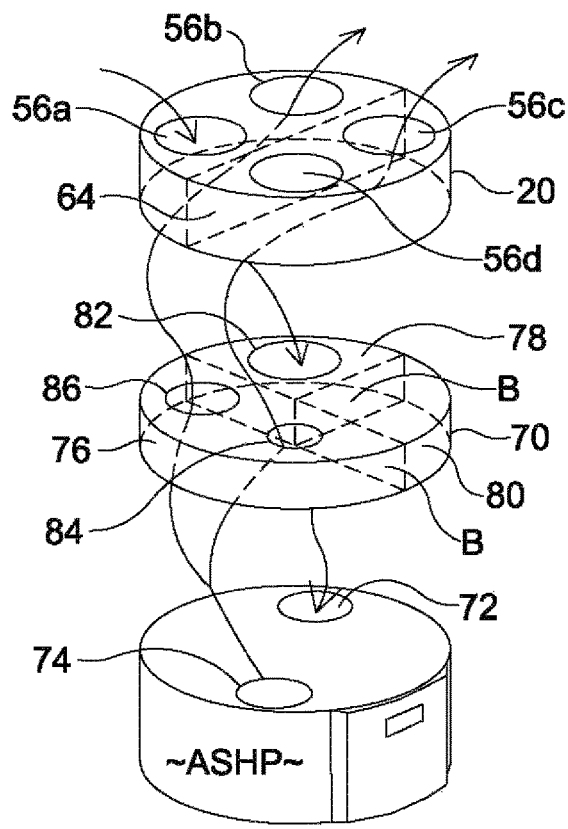
Figure 7A:
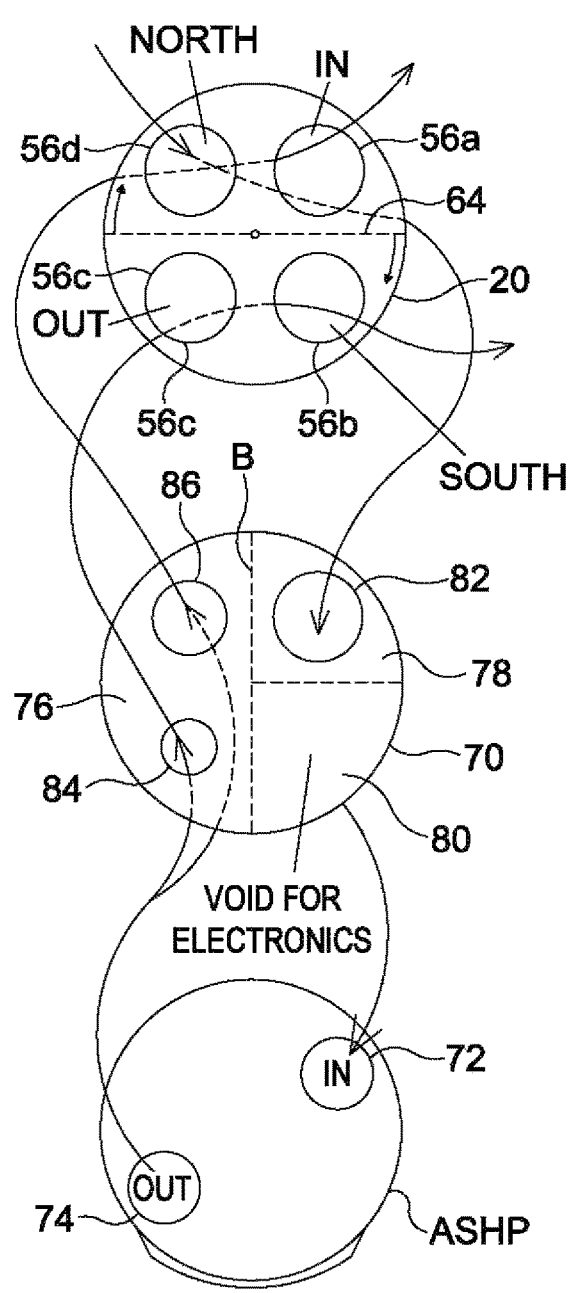
Figure 7B:
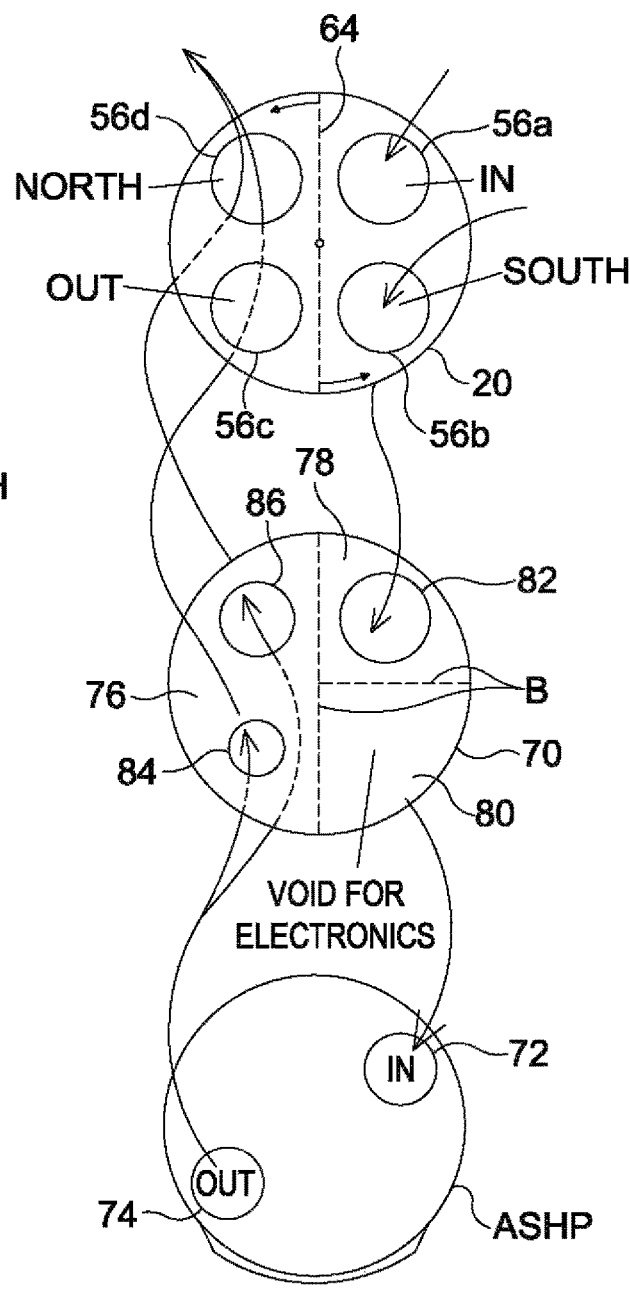

FIGS. 7a and 7c show the unit 68 in the summer setting, and FIG. 7b shows the unit 20 in the winter setting; the curved arrows show the direction of the air flows through the unit.

The transition drum 70 is divided internally into separate chambers by baffles B, the chambers occupying one half 76 of the transition drum 70, and two quadrants 78, 80; one chamber 78 has a port 82 directly under the port 56a of the flow diverter 20 which leads to the MVHR. This port 82 is directly over the inlet port 72 of the ASHP, so the air always enters the ASHP no matter which side of the roof the air is coming in from, north or south, this is done automatically as the flow diverter 20 switches. The other quadrant chamber 80 is empty, and may contain control electronics for the system. The half chamber 76 has two ports 84, 86 beneath ports 56c and 56d respectively. The air leaving the ASHP leaves through the other port 74 on the opposite side of the transition drum 70. This is no problem when in winter setting however in summer setting the cold air leaving mixes directly with the fresh air entering (which could make the air entering the ASHP colder and colder), see FIG. 7c showing ports 82, 84. To ensure the air entering the house does not get continually colder and as we want to both cool the incoming air to the house and cool the PV array at the same time there are two ports for this; one 84 communicates with the flow diverter 20 at the bottom under the port 56d and the other port 82 communicates directly with port 56c, so the air flow from there cools the PV. The port 84 has a one-way valve ensuring the air being removed does not mix when the unit is in the summer setting and the ASHP is off. The volumes in chambers 76 and 82 adds to the plenum effect described above in connection with the flow diverter 20.

Figure 8:
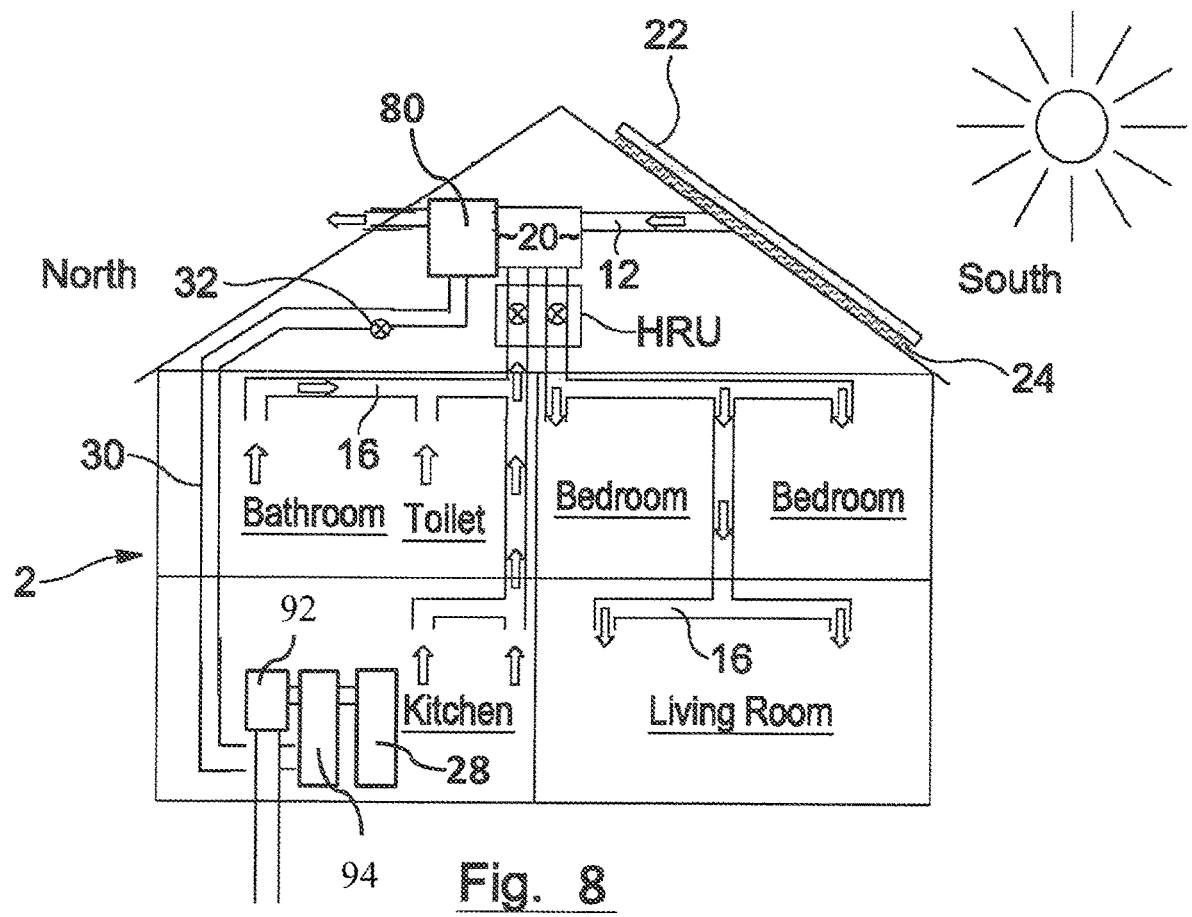
FIG. 8 is a further schematic view of the house of FIG. 3, but additionally provided with a cascade Ground Source Heat Pump (GSHP) arrangement, a heat exchanger and a heat sink.

It will of course be understood that many variations may be made to the above-described embodiments without departing from the scope of the present invention. For example, the flow diverter ports 56a-d could be located on the cylindrical casing 50 rather than on the top plate 52. Although shown and described as cylindrical, the casing need not be cylindrical: for some applications, particularly in an installation for a large, commercial building, it would be simpler and easier to fabricate the flow diverter with a square or rectangular casing. With such a rectangular casing the rotating vane would seal against the top and bottom of the casing as the vane rotates, but it would only seal at its rotating edge at one of its end positions; this should not be problematic and would not adversely affect air flows provided the vane rotation is reasonably quick. The system could be used in a building with a flat roof, but this would require the air ports to be located such that the air in their vicinity was likely to be at different temperatures, such as by mounting them on different sides of the building (the air ports could not be on the roof, since being flat the air above this would be all at the same temperature). There could be a plurality of first and second ports, each located on a different part of the building and with ducting leading towards the flow diverter, with a temperature sensor system for sensing the temperature of the air immediately outside each port and arranged to switch the flow to the flow diverter from a port where the air temperature enables most efficient operation of the system. Not all of these ports need be located on the pitched roof; there may be more suitable locations in some situations, such as on soffits or under eaves, or even close to the ground. Moreover, it could be sufficient in some situations for the inlet and outlet ports to face in the same direction where one is in shade and the other in full sunlight, for example. The system may be automatically controlled so as to switch flow direction at one temperature when the ambient temperature is rising, and to switch flow direction again at a second temperature different from the first temperature when the outside temperature is falling. Alternatively there may be just a single threshold temperature at which the actuator mechanism 58 is prompted to move the vane between the two positions. Where there is a GSHP as shown in FIG. 8, there could be two such devices "in cascade", so that a larger GSHP 94 can be connected to the heat sink 28 and a smaller GSHP 94 can be connected to the heat exchanger 80 in the roof (between the port on the cool, North side of the roof and the flow diverter 20) and the larger GSHP 94, and arranged to cool or heat up the boreholes (shown extending below the GSHP 92); as is known, such an arrangement reduces the power required for the GSHP in most circumstances but retains the overall GSHP throughput required to heat or cool the building when ambient temperatures are most demanding. Although described with reference to a home or domestic building, the invention is not limited to buildings of any particular function or size, and it is equally as applicable to large commercial buildings. Additional implementation details and straightforward variations or modifications will be apparent to those skilled in the art.

Where different variations or alternative arrangements are described above, it should be understood that embodiments of the invention may incorporate such variations and/or alternatives in any suitable combination.

The invention claimed is:

1. A Mechanical Ventilation Heat Recovery (MVHR) system for a building, the building having at least two large outer surfaces facing in different directions, the MVHR system comprising a Heat Recovery Unit (HRU) for receiving and exchanging heat between a flow of ambient air from outside the building and a flow of building air from within the building, the HRU being connected by fluid flow conduits to first and second ports located on two different surfaces, of the at least two large outer surfaces of the building facing in different directions, in which a flow diverter is provided in the conduits between the HRU and the ports, the flow diverter being switchable between a first state in which ambient air flows from the first port to the HRU and into the building and building air flows from the HRU to the second port to be exhausted from the building, and a second state in which ambient air flows from the second port to the HRU and into the building and building air flows from the HRU to the first port to be exhausted from the building.

2. The MVHR system according to claim 1 in which the flow diverter is adapted to switch the flows of ambient and building air between the first and second states simultaneously.

3. The MVHR system according to claim 1 in which the flow diverter comprises a generally cylindrical drum having four ports for air to flow through located on at least one end face of the drum, the drum containing a rotatable vane, the four ports being disposed such that rotation of the vane within the drum switches air flows between the first and second states, or vice versa.

4. The MVHR system according to claim 1 comprising a sensor for determining the ambient temperature outside the building, and a controller adapted to switch the flow diverter from the first state to the second when the ambient temperature exceeds a first threshold temperature.

5. The MVHR system according to claim 4, in which the controller is adapted to switch the flow diverter from the second state to the first when the ambient temperature is less than a second threshold temperature.

6. The MVHR system according to claim 1, further comprising an Air Source Heat Pump (ASHP) in the fluid flow conduit between one of the ports and the flow diverter for exchanging heat between ambient air and building air.

7. The MVHR system according to claim 6, further comprising a heat sink for storing heat absorbed by the ASHP from ambient air flowing from the said port to the HRU.

8. The MVHR system according to claim 6, wherein the ASHP is powered by a solar photovoltaic power (PV) system.

9. The MVHR system according to claim 8 comprising a mechanism for temporarily reversing flows of air flowing through the MVHR system.

10. The MVHR system according to claim 6 further comprising a mechanism configured to direct the flows of air to ensure that the flows of air through the ASHP remain in the same direction regardless of the state of the flow diverter.

11. The MVHR system according to claim 10 in which the flow diverter, the ASHP and the mechanism configured to direct air flows form a single unit.

12. A building having a roof with at least two pitched slopes which form major surfaces in which the first and second large outer surfaces are located, the building comprising the MVHR system according to claim 11, in which a PV system comprises a flat panel array, which is mounted so as to lie against but spaced from one of the at least two pitched slopes of the roof of the building, and so as to overlie the port in the slope.

13. The MVHR system according to claim 1, further comprising at least one Ground Source Heat Pump (GSHP).

14. The MVHR system according to claim 13, further comprising a heat sink, and in which there is a first GSHP in thermal communication with the heat sink and a second, GSHP in thermal communication with the first GSHP and with a borehole or ground source, the first and second GSHPs being adapted to act in cascade and wherein the second GSHP is smaller than the first GSHP.

15. A method of operating a MVHR system for a building, the system comprising a Heat Recovery Unit (HRU) for receiving and exchanging heat between a flow of ambient air from outside the building and a flow of building air from within the building, the method comprising switching the flows of air between a first state in which ambient air flows from a first port to the HRU and into the building and building air flows from the HRU to a second port to be exhausted from the building, and a second state in which ambient air flows from the second port to the HRU and into the building and building air flows from the HRU to the first port to be exhausted from the building, wherein the method comprises locating the first and second ports on outer surfaces of different parts of the building, which parts face in different directions.

* * * * *